United States Patent
Ichihara (10) Patent No.: US 10,171,743 B2
(45) Date of Patent: Jan. 1, 2019

(54) IMAGE PICKUP APPARATUS, IMAGE PROCESSING APPARATUS, IMAGE PROCESSING METHOD, AND NON-TRANSITORY COMPUTER-READABLE STORAGE MEDIUM FOR IMPROVING QUALITY OF CAPTURED IMAGE

(71) Applicant: CANON KABUSHIKI KAISHA, Tokyo (JP)

(72) Inventor: Ko Ichihara, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 16 days.

(21) Appl. No.: 15/370,371

(22) Filed: Dec. 6, 2016

(65) Prior Publication Data
US 2017/0187938 A1    Jun. 29, 2017

(30) Foreign Application Priority Data
Dec. 24, 2015 (JP) ................. 2015-251192

(51) Int. Cl.
 H04N 5/235      (2006.01)
 H04N 5/265      (2006.01)
 H04N 5/355      (2011.01)

(52) U.S. Cl.
 CPC ......... *H04N 5/2351* (2013.01); *H04N 5/2355* (2013.01); *H04N 5/2356* (2013.01); *H04N 5/265* (2013.01); *H04N 5/355* (2013.01); *H04N 5/35554* (2013.01); *H04N 5/35563* (2013.01)

(58) Field of Classification Search
None
See application file for complete search history.

(56) References Cited

U.S. PATENT DOCUMENTS

| | | | | |
|---|---|---|---|---|
| 6,864,916 B1* | 3/2005 | Nayar | ................. | H04N 5/2355 348/224.1 |
| 7,492,391 B1* | 2/2009 | Kaplinsky | ................. | G06T 5/50 348/211.3 |
| 8,446,481 B1* | 5/2013 | Geiss | ................. | H04N 5/2353 348/221.1 |
| 9,402,035 B2* | 7/2016 | Benderius | ........... | H04N 5/2353 |
| 9,426,350 B2* | 8/2016 | Konishi | ............... | H04N 5/2352 |
| 9,628,748 B2* | 4/2017 | Honda | ................ | H04N 5/77 |
| 9,836,132 B2* | 12/2017 | Chen | ................. | G06F 3/0317 |

(Continued)

FOREIGN PATENT DOCUMENTS

JP    2008104009 A    5/2008

OTHER PUBLICATIONS

Rouf et al., "Gradient Domain Color Restoration of Clipped Highlights", The University of British Columbia, CVPRW 2012, Jun. 2012, pp. 1-8.

*Primary Examiner* — Cynthia Segura
(74) *Attorney, Agent, or Firm* — Rossi, Kimms & McDowell LLP (57) ABSTRACT

An image pickup apparatus (10) includes an image sensor (102) which photoelectrically converts an optical image formed via an image pickup optical system to output image data, an estimator (104a) which estimates a luminance value of a saturated pixel of the image sensor based on a single image corresponding to the image data, a setter (104b) which sets an exposure parameter based on the luminance value, and a controller (107) which performs photography based on the exposure parameter.

13 Claims, 7 Drawing Sheets

(56) References Cited

U.S. PATENT DOCUMENTS

| | | | |
|---|---|---|---|
| 2004/0218830 A1* | 11/2004 | Kang | G06T 5/50 382/274 |
| 2004/0239798 A1* | 12/2004 | Nayar | H04N 5/235 348/362 |
| 2008/0106634 A1* | 5/2008 | Masuda | H04N 5/2258 348/362 |
| 2008/0226279 A1* | 9/2008 | Dey | G03B 7/08 396/234 |
| 2010/0141792 A1* | 6/2010 | Arai | H04N 5/23248 348/229.1 |
| 2012/0287307 A1* | 11/2012 | Oyama | H04N 5/217 348/234 |
| 2012/0288192 A1* | 11/2012 | Heidrich | G06T 5/005 382/167 |
| 2013/0120607 A1* | 5/2013 | Manabe | H04N 5/2355 348/223.1 |
| 2013/0215296 A1* | 8/2013 | Oniki | G06T 5/008 348/241 |
| 2013/0293703 A1* | 11/2013 | Imamura | H04N 5/35563 348/135 |
| 2014/0092226 A1* | 4/2014 | Kuriyama | G02B 23/2469 348/68 |
| 2014/0139705 A1* | 5/2014 | Ebe | H04N 5/217 348/234 |
| 2014/0267883 A1* | 9/2014 | Vidal-Naquet | G06T 7/00 348/362 |
| 2015/0172618 A1* | 6/2015 | Takahashi | H04N 5/33 348/164 |
| 2015/0244923 A1* | 8/2015 | Lee | H04N 9/045 348/234 |
| 2016/0073050 A1* | 3/2016 | Honda | H04N 5/77 348/229.1 |
| 2016/0125575 A1* | 5/2016 | Takahashi | G06T 5/50 382/275 |
| 2016/0344952 A1* | 11/2016 | Ichihara | H04N 13/232 |
| 2016/0352996 A1* | 12/2016 | Qian | G06T 5/007 |
| 2017/0095297 A1* | 4/2017 | Richmond | A61B 1/00006 |
| 2018/0080877 A1* | 3/2018 | Hirawake | G01N 21/64 |
| 2018/0176440 A1* | 6/2018 | Chen | H04N 13/254 |

* cited by examiner

IMAGE PICKUP APPARATUS, IMAGE PROCESSING APPARATUS, IMAGE PROCESSING METHOD, AND NON-TRANSITORY COMPUTER-READABLE STORAGE MEDIUM FOR IMPROVING QUALITY OF CAPTURED IMAGE

BACKGROUND OF THE INVENTION

Field of the Invention

The present invention relates to an image pickup apparatus which improves quality of a captured image.

Description of the Related Art

When a bright object is captured by using an image pickup apparatus including s solid-state image sensor, blown-out highlights (luminance saturation) may occur in a captured image. In a region (luminance-saturated region or saturated pixel region) where the luminance saturation occurs, luminance information outside a luminance range of the image sensor (i.e., information relating to a pixel value greater than a saturated pixel value) is lost.

Previously, a method of synthesizing (combining) a plurality of images captured with different exposure values to generate a High Dynamic Range (HDR) image where the luminance range of the image sensor is widened to be captured is known. The exposure value is an index indicating a degree of exposure, which is determined depending on an aperture value of an image pickup system and an exposure time. The plurality of images used for the generation of the HDR image can be obtained for example by HDR bracket photographing where continuous photographing is performed with a plurality of different exposure values.

In this case, in order to obtain a high-quality image where the luminance saturation is sufficiently reduced, an image that is captured with a sufficiently-large exposure value and that is appropriate for a bright object in an angle of view is required. Accordingly, when the HDR photographing (HDR bracket photographing) is to be performed, it is necessary to repeat reading pixel values while previously changing the exposure value and acquire a sufficiently-large exposure value by using a photometry device. In other words, when the HDR photographing is to be performed, it is necessary to prepare to acquire an appropriate exposure value based on the plurality of images or an output value of the photometry device.

Japanese Patent Laid-open NO. 2008-104009 discloses a method of acquiring an exposure value based on a previously-prepared table by using a cumulative pixel value histogram of a previously-captured single image to perform the preparation described above. The literature "CVPRW 2012, JUNE 2012, GRADIENT DOMAIN COLOR RESTORATION OF CLIPPED HIGHLIGHTS" discloses a method of estimating a luminance value based on a single image.

As described above, when the HDR bracket photographing is to be performed, it is necessary to prepare to acquire the appropriate exposure value based on the plurality of images or the output value of the photometry device, and thus it requires time. In this regard, in the method disclosed in Japanese Patent Laid-open No. 2008-104009, the preparation can be performed based on a single image. However, in the method disclosed in Japanese Patent Laid-open No. 2008-104009, the exposure value is acquired based on the cumulative pixel value histogram of the single image, and accordingly it is difficult to acquire a sufficiently-large exposure value that is appropriate for a bright object in an image.

SUMMARY OF THE INVENTION

The present invention provides an image pickup apparatus, an image processing apparatus, an image processing method, and a non-transitory computer-readable storage medium which improve quality of a captured image easily and quickly.

An image pickup apparatus as one aspect of the present invention includes an image sensor configured to photoelectrically convert an optical image formed via an image pickup optical system to output image data, an estimator configured to estimate a luminance value of a saturated pixel of the image sensor based on a single image corresponding to the image data, a setter configured to set an exposure parameter based on the luminance value, and a controller configured to perform photography based on the exposure parameter.

An image processing apparatus as another aspect of the present invention includes an estimator configured to estimate a luminance value of a saturated pixel of an image sensor based on a single image, and a setter configured to set an exposure parameter based on the luminance value.

An image processing method as another aspect of the present invention includes the steps of estimating a luminance value of a saturated pixel of an image sensor based on a single image, and setting an exposure parameter based on the luminance value.

A non-transitory computer-readable storage medium as another aspect of the present invention stores an image processing program which causes a computer to execute a process including the steps of estimating a luminance value of a saturated pixel of an image sensor based on a single image, and setting an exposure parameter based on the luminance value.

Further features the present invention will become apparent from the following description of exemplary embodiments with reference to the attached drawings.

DESCRIPTION OF THE EMBODIMENTS

Exemplary embodiments of the present invention will be described below with reference to the accompanied drawings.

First of all, a mechanism where luminance saturation occurs in a solid-state image sensor will be described. An image pickup apparatus such as a digital camera includes a CCD (Charge Coupled Device) and a CMOS (Complementary Metal Oxide Semiconductor) sensor. The solid-state image sensor photoelectrically converts incident light into charges (electric charges) to be read for each pixel, and thus it can obtain an intensity distribution of light illuminated on a two-dimensional surface as an image.

Figure 1:
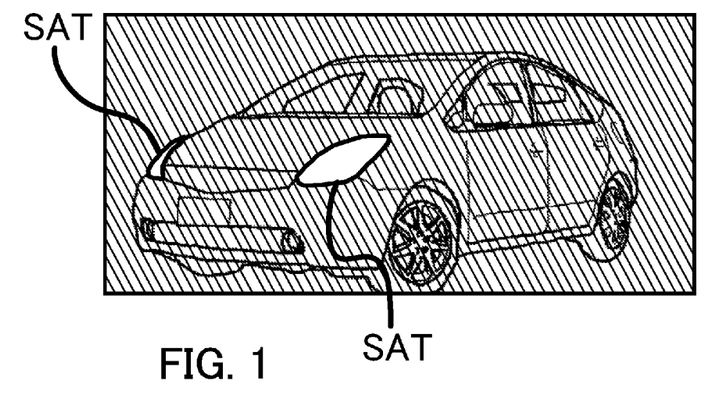
FIG. 1 is an example where a luminance-saturated region occurs.

A charge amount accumulable by each pixel of the solid-state image sensor at a time is limited, and an amount of charges greater than a saturated charge amount is lost in a pixel where light with high luminance value is incident. A pixel where an accumulable maximum charge amount is accumulated of a plurality of pixels of the image sensor is referred to as a saturated pixel, and a region where the saturated pixel exists is referred to as a saturated pixel region (luminance-saturated region). The luminance-saturated region appears on an image as blown-out highlights with a pixel value as a saturated pixel value corresponding to the accumulable maximum charge amount (saturated charge amount). FIG. 1 is an example of an image where the luminance-saturated region occurs, and it illustrates a schematic diagram of a captured image of a vehicle where headlights are being turned on at night. In FIG. 1, regions SAT are the luminance-saturated regions.

In an image captured by an image pickup apparatus such as a digital camera, typically, various noises such as a photon shot noise and a dark current noise are recorded as a pixel value. When light incident on the solid-state image sensor is insufficient and accordingly an amount of charges accumulated in a pixel is extremely small, it is difficult to distinguish a read output signal from a noise. Such a phenomenon is called blocked-up shadows. A range from a light amount where the blocked-up shadows occur to a light amount where the luminance saturation occurs is called a luminance range of the image sensor.

Figure 2A:
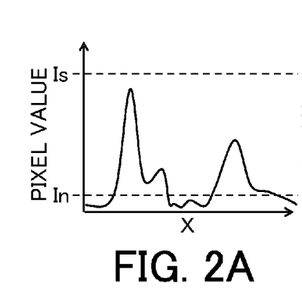
FIGS. 2A to 2E are one-dimensional pixel value distributions in an image.
Figure 2B:
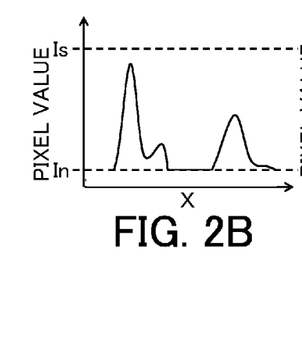

FIG. 2B is a one-dimensional pixel value distribution of an image captured with a certain exposure value, and a horizontal axis and a vertical axis indicate an X coordinate of the image and a pixel value, respectively. In FIG. 2B, symbol In denotes a minimum pixel value which can be distinguished from a noise, and symbol Is denotes a saturated pixel value. A pixel value region between the minimum pixel value In and the saturated pixel value Is corresponds to a luminance range of the image sensor. Typical digital cameras can adjust an amount of light incident on the solid-state image sensor by changing an aperture diameter of a lens or a shutter speed. This adjustment amount can be represented as an index called an exposure value. The generation of the luminance saturation can be prevented by adjusting the exposure value to reduce the amount of incident light during the photography. The exposure value indicates zero when the aperture value (F number) is F1 and the shutter speed is a second, and it increases by one when the amount of incident light halves.

The generation of the luminance saturation can be prevented by increasing the exposure value. However, when the exposure value increases too much, the amount of incident light is insufficient in a dark region in an angle of view, and accordingly blocked-up shadows occur. Accordingly, as illustrated in FIG. 1, when an especially bright region (region SAT) compared to its peripheral region exists in a photographing angle of view, there may be a case in which an appropriate exposure value where neither the luminance saturation nor the blocked-up shadows occur in an entire region of the photographing angle of view does not exist.

Figure 2C:
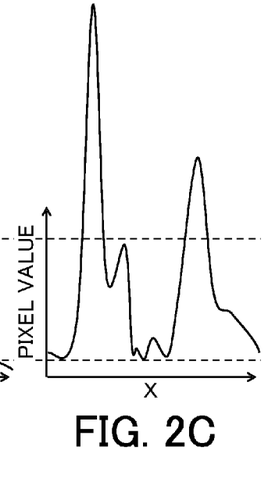

The generations of the luminance saturation and the blocked-up shadows in the angle of view can be reduced by synthesizing images captured with a plurality of exposure values. The image generated as described above is called an HDR image. Hereinafter, referring to FIGS. 2A to 2E, an outline of the HDR image will be described. FIGS. 2A and 2C are one-dimensional pixel value distributions of two images captured with exposure values different from each other with respect to a certain scene. In each of FIGS. 2A to 2E, a horizontal axis and a vertical axis indicate an X coordinate of the image and a pixel value, respectively. While FIGS. 2A and 2C are illustrated on the assumption that all the luminance information can be recorded, in reality, the luminance range of the image sensor is limited and accordingly blocked-up shadows and blown-out highlights occur as illustrated in FIGS. 2B and 2D, respectively.

Figure 2D:
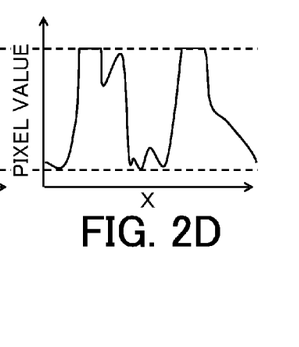

While the blocked-up shadows or the blown-out highlights occurs in each of the two images illustrated in FIGS. 2B and 2D, all the luminance information of an object is subject to be recorded by combining these two images. Accordingly, by combining (synthesizing) the two images illustrated in FIGS. 2B and 2D, the HDR image where the luminance range of the image sensor is widened to be captured can be generated.

Figure 2E:
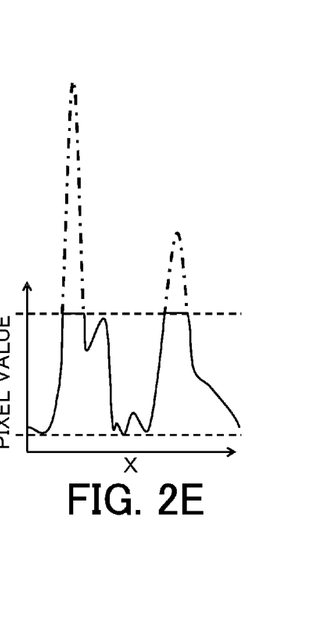

The method of generating the HDR image by using two images with different exposure values is commonly known. In the simplest manner, with respect to the image illustrated in FIG. 2D, a value obtained by multiplying a constant by a pixel value of a corresponding pixel of the image illustrated in FIG. 2B may be added to a pixel value of a pixel in a region where the luminance saturation occurs. This constant is calculated based on respective exposure values obtained when capturing the images of FIGS. 2B and 2D. For example, when an absolute value of a difference of the respective exposure values is ΔEV, a value obtained by multiplying 2 by ΔEV is used as the constant. FIG. 2E is a one-dimensional pixel value distribution of the HDR image generated as described above, and the added pixel value is indicated by a dashed-dotted line.

While the method of generating the HDR image by synthesizing the two images with different exposure values is described, alternatively, there is a method of using an image sensor which can change an exposure value for each pixel. For example, in addition to the aperture stop of the image pickup optical system, an image sensor including an aperture which can be driven for each pixel is used. An image is captured while the size of the aperture (opening) is decreased for a pixel where light from a bright object is incident, and on the other hand the size of the aperture is increased (i.e., the aperture is open) for a pixel where light from a dark object is incident. Thus, it is possible to capture the HDR image with different exposure values for each region on the image by a single photography. Alternatively, an image sensor which is capable of changing an exposure time for each pixel may be used. In other words, the image sensor which is capable of changing the exposure value for each pixel by reading accumulated charges at an arbitrary timing for each pixel may be used. An image sensor which is capable of changing the exposure value for each pixel by setting a different readout gain for each pixel to an output signal of the pixel can be used. An image sensor including a device which is capable of independently controlling a transmittance of a liquid crystal device or the like for each pixel may be used.

With respect to photographing a plurality of images which are used for synthesizing (generating) the HDR image described above, it is necessary to recognize a plurality of appropriate exposure values for a plurality of objects with different brightness in an angle of view before the photography. Conventionally, when acquiring the HDR image, a plurality of appropriate exposure values were acquired based on a plurality of images or they were acquired based on a predetermined parameter.

Next, referring to FIGS. 3A to 3G, a method of estimating a luminance value based on a single image including a saturated pixel value will be described. A basic principle of this method is disclosed in "CVPRW 2012, JUNE 2012, GRADIENT DOMAIN COLOR RESTORATION OF CLIPPED HIGHLIGHTS". FIGS. 3A to 3G are explanatory diagrams of the method of estimating the luminance value based on a single image. In FIGS. 3A to 3G, a horizontal axis and a vertical axis indicate an X coordinate and a pixel value, respectively.

Figure 3A:
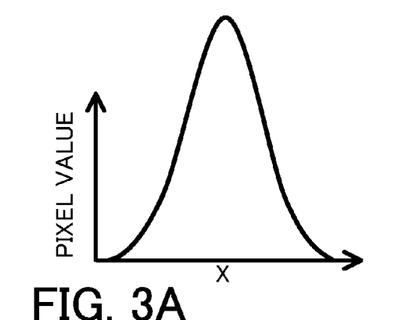
FIGS. 3A to 3G are explanatory diagrams of a method of estimating a luminance value of the luminance-saturated region based on a single image.
Figure 3B:
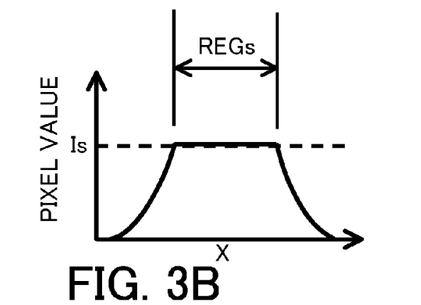

FIG. 3A illustrates a one-dimensional pixel value distribution of an image of a bright light source captured by using an image pickup apparatus including an ideal image sensor with a sufficiently-wide luminance range. On the other hand, FIG. 3B is a one-dimensional pixel value distribution of an image of the same light source as that of FIG. 3A captured with the same exposure value by using an image pickup apparatus including an image sensor with a limited luminance range. In the image of FIG. 3B, the luminance range of the image sensor is limited, and accordingly the luminance saturation occurs and a pixel value of a pixel in the luminance-saturated region REGs indicates the saturated pixel value Is.

Figure 3C:
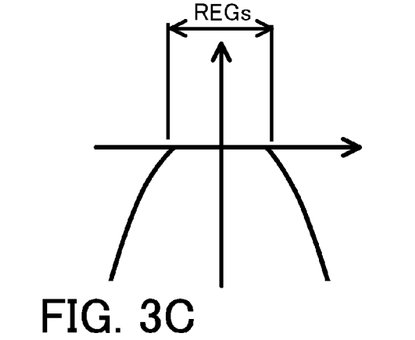
Figure 3D:
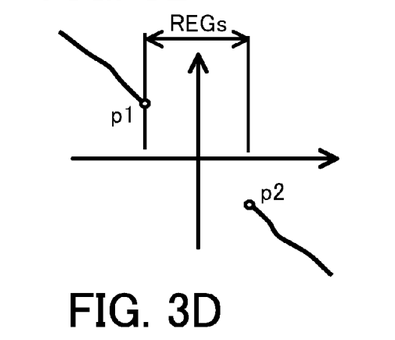
Figure 3E:
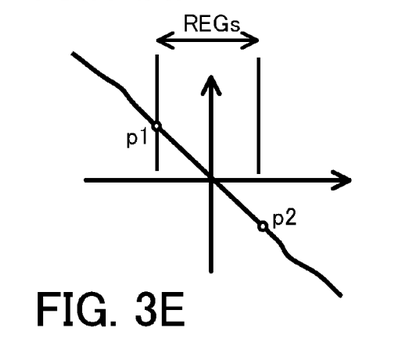
Figure 3F:
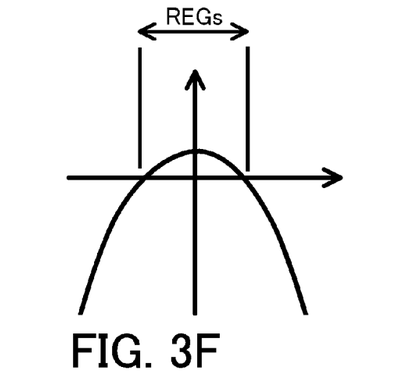

In this embodiment, as described below, lost luminance information is estimated. First, a differential value is calculated with respect to a logarithm of a pixel value distribution f. The differential value is a difference of adjacent (or nearby) pixels in an image. FIG. 3C illustrates a logarithm (log(f)) of the pixel value distribution f, and FIG. 3D illustrates a differential value $\nabla$ log(f) of the logarithm. Since a typical image is constituted by for example eight bits, the pixel value is an integer from 0 to 255. However, for simplifying descriptions, it is assumed that the saturated pixel value Is (luminance-saturated value) is 1 and the pixel value is a fractional value from 0 to 1. Therefore, in the luminance-saturated region REGs, each of log(f) and the differential value $\nabla$ log(f) of log(f) is 0.

Subsequently, a region where the differential value $\nabla$ log(f) is 0 between boundary points p1 and p2 located between the luminance-saturated region REGs and its peripheral region is reconstructed based on the boundary points p1 and p2. Specifically, in the luminance-saturated region REGs, the reconstruction is performed by solving Laplace's equation as represented by expression (1) below.

$$\nabla^2(\nabla \log f) = 0 \tag{1}$$

Methods of obtaining the numerical solution of the Laplace's equation are widely known, and any methods can be used. In this embodiment, for example, by using a difference method is used, expression (1) results in a simultaneous equation represented by expression (2) below.

$$I(i,j) = I(i+1,j) + I(i-1,j) + I(i,j+1) + I(i,j-1) \tag{2}$$

While FIGS. 3A to 3G illustrate one-dimensional pixel value distributions of an image for simplicity, expression (2) describes a two-dimensional image. On the two-dimensional image, the boundary points p1 and p2 are a part of a boundary region located between the luminance-saturated region PEGs and the peripheral region. A condition of I=$\nabla$ log(f) is satisfied, and symbols i and j indicate indices on Y and X coordinates, respectively. In other words, simultaneous equations whose number corresponds to the number of pixels in the luminance-saturated region REGs exist. Various methods of solving the simultaneous equations are known, and any methods can be used. In this embodiment, for example Gauss-Seidel method is used. Specifically, the calculation of expression (2) is performed for all pixels in the luminance saturated region, and a variation Err (i,j) of values obtained before and after the calculation is calculated for each pixel. When a maximum value of Err(i,j) is not greater than a previously-set threshold value as a result of the repetition of the calculation, the calculation is completed. An arbitrary value can be set as the threshold value. According to the calculation described above, a pixel value distribution $\nabla$ log(f) illustrated in FIG. 3E can be obtained.

Subsequently, by solving Poisson's equation represented by expression (3) below, log(f) is reconstructed in the luminance-saturated region REGs.

$$\nabla^2 \log(f) = \nabla \cdot (\nabla \log(f)) \tag{3}$$

Methods of obtaining the numerical solution of the Poisson's equation are widely known, and any methods can be used. In this embodiment, for example, by using a difference method is used, expression (3) results in a simultaneous equation represented by expression (4) below.

$$J(i,j) = J(i,j) + J(i+1,j) + J(i-1,j) + J(i,j+1) + J(i,j-1) \tag{4}$$

Figure 3G:
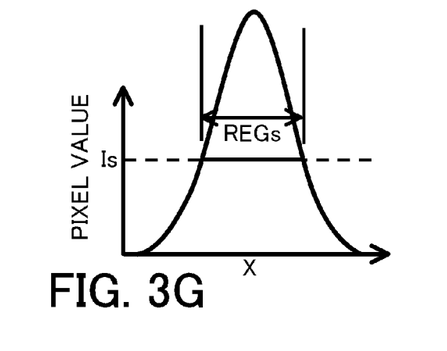

In expression (4), a condition of J=log(f) is satisfied, and accordingly a condition of I=$\nabla$ log(f) is satisfied. When the continuous equation of expression (4) is solved by the Gauss-Seidel method described above, log(f) illustrated in FIG. 3F is obtained. Furthermore, by calculating exponents of log(f), a pixel value distribution f illustrated in FIG. 3G is obtained. As described above, in this embodiment, the luminance value (i.e., pixel value corresponding to a real luminance value) of the saturated pixel is estimated based on a difference of pixel values of a plurality of pixels (adjacent pixel or nearby pixel) at the boundary of the saturated pixel region including the saturated pixel. Preferably, the pixel value distribution of relating to the luminance value of the saturated pixel is estimated to satisfy expressions (1) and (3) by using, as an initial value, a pixel value of a pixel at the boundary of the saturated pixel region. As described above, by reconstructing the pixel value in the luminance-saturated region REGs, it is possible to estimate a luminance value which cannot be obtained due to the generation of the luminance saturation.

While the method of estimating the luminance value in this embodiment is described above, this embodiment is not limited to this estimation method. As long as a method of estimating a luminance value which cannot be obtained due to luminance saturation based on a single image, other methods can be also used.

Embodiment 1

Figure 4:
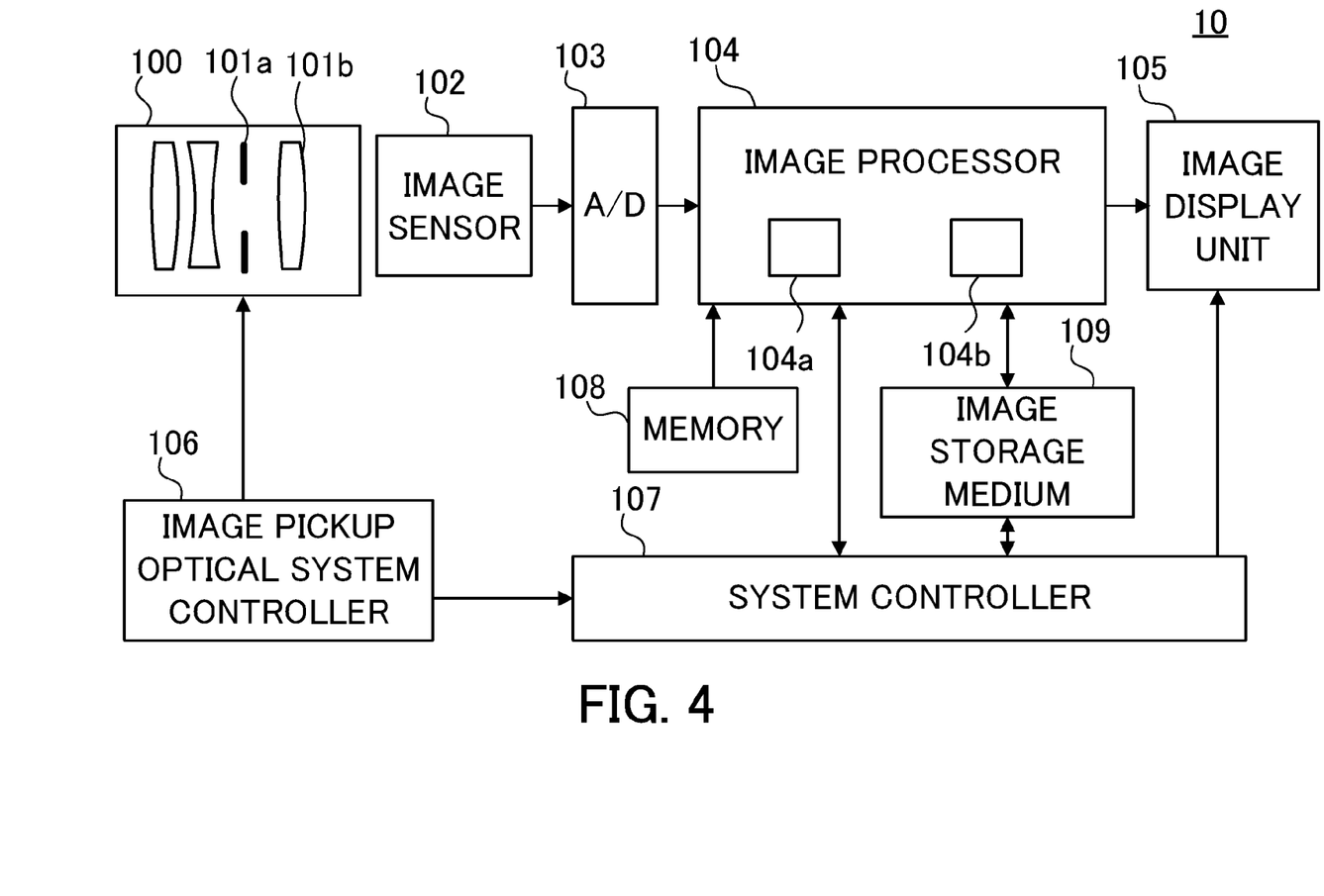
FIG. 4 is a block diagram of an image pickup apparatus in each embodiment.

First, referring to FIG. 4, an image pickup apparatus in Embodiment 1 of the present invention will be described. FIG. 4 is a block diagram of an image pickup apparatus 10 in this embodiment. The image pickup apparatus 10 estimates a maximum luminance value based on a single image, and sets an exposure value based on the estimated maximum luminance value to perform HDR bracket photography.

An image pickup optical system 100 includes an aperture stop 101a and a focus lens 101b, and it forms an image of light from an object (not illustrated) on an image sensor 102. The image sensor 102 is a solid-state image sensor such as a CMOS sensor and a CCD sensor, and it photoelectrically converts an object image (optical image) formed via the image pickup optical system 100 to output image data (analog electric signal). An A/D converter 103 converts the analog electric signal output from the image sensor 102 into a digital signal, and it outputs the digital signal to an image processor 104.

The image processor 104 corresponds to an image processing apparatus included in the image pickup apparatus 10, and it includes an estimator 104a (estimating unit) and a setter 104b (setting unit). The estimator 104a of the image processor 104 detects a luminance-saturated region (saturated pixel region) in an input image (single image), and it estimates a maximum luminance value in the luminance-saturated region. Then, the setter 104b of the image processor 104 calculates an exposure parameter based on the estimated maximum luminance value. Furthermore, the image processor 104 synthesizes (combines) a plurality of input images to output a synthetic image (HDR image). The HDR image (synthetic image or composite image) generated by the image processor 104 is stored in an image storage medium 109 such as a semiconductor memory and an optical disk. The HDR image may be displayed on an image display unit 105. A memory 108 stores various data, such as a saturated pixel value Is of the image sensor 102, required for processing performed by the image processor 104.

A system controller 107 (controller) controls a drive of the image sensor 102, processing by the image processor 104, and an operation of the image pickup optical system 100. Mechanical drives of the aperture stop 101a and the focus lens 101b in the image pickup optical system 100 are performed by an image pickup optical system controller 106 according to an instruction (control signal) of the system controller 107. An opening diameter (aperture diameter) of the aperture stop 101a is controlled depending on a set aperture value (F number). The focus lens 101b performs focusing (focus control) depending on an object distance, and accordingly its position is controlled by an AF system or a manual focus mechanism (not illustrated). While the image pickup optical system 100 is integrated with the image pickup apparatus 10 (image pickup apparatus body) in FIG. 4, this embodiment is not limited thereto. Alternatively, the image pickup optical system 100 may be an interchangeable lens that is removably attached to the image pickup apparatus body (single-lens reflex camera).

Figure 5:
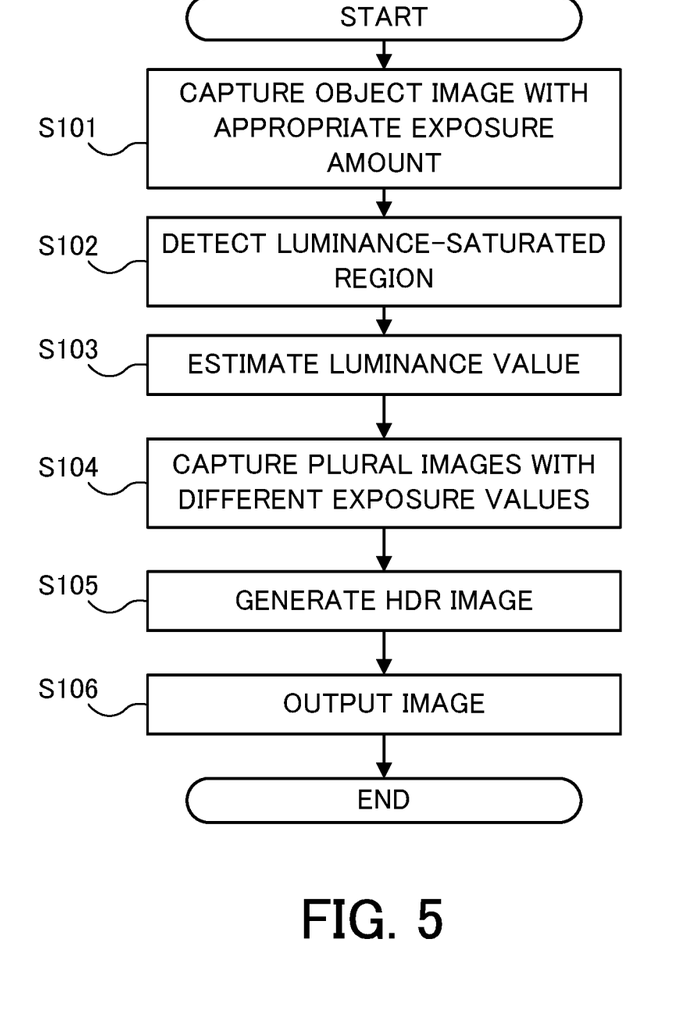
FIG. 5 is a flowchart of an image processing method in Embodiment 1.

Next, referring to FIG. 5, an image processing method (image processing program) in this embodiment will be described. Each step of FIG. 5 is mainly performed by the image processor 104 (the estimator 104a and the setter 104b) based on an instruction of the system controller 107.

First, at step S101, the system controller 107 controls an image pickup system including the image pickup optical system 100 and the image sensor 102 to perform photographing of an object. As an exposure value EVp during photography, for example a value appropriate for an object being targeted (i.e., targeted object), which is acquired by commonly known spot photometry using a photometry device (not illustrated) is used. The image processor 104 generates an image IMGp (preparation image) by using a digital signal output from the image sensor 102 and obtained by the A/D conversion of the A/D converter 103.

Subsequently, at step S102, the image processor 104 reads the saturated pixel value Is from the memory 108, and it detects, as a pixel included in a luminance-saturated region REGs, a pixel which indicates the saturated pixel value Is as a pixel value in the image IMGp. If any pixel which indicates the saturated pixel value Is as the pixel value does not exist, steps S103 to S105 described below are skipped and the image IMGp can be dealt with as an output image.

Subsequently, at step S103, the image processor 104 (estimator 104a) performs luminance value estimation processing on the luminance-saturated region REGs of the image IMGp. Specifically, the image processor 104 reconstructs a pixel value distribution of the luminance-saturated region REGs by the luminance value estimation method described above referring to FIGS. 3A to 3G, and it acquires maximum pixel values for respective luminance-saturated regions to acquire a maximum pixel value Imax based on them. Then, the image processor 104 (setter 104b) calculates an appropriate maximum exposure value EVs as represented by expression (5) below by using the exposure value EVp (first exposure value) during capturing the image IMGp and the maximum pixel value Imax (second exposure value).

$$EVs = EVp + \log_2 \text{ceil}(I_{max}/I_s) \quad (5)$$

In expression (5), symbol ceil denotes a function of rounding up digits after the decimal point.

Subsequently, at step S104, the system controller 107 controls the image pickup system to perform the photography a plurality of times. Thus, in this embodiment, the setter 104b sets an exposure parameter based on the first exposure value (i.e., exposure value appropriate for a dark object) and the second exposure value (i.e., exposure value appropriate for a bright object). Preferably, the system controller 107 performs the photography with the first exposure value to acquire a first image including the saturated pixel value, and it performs the photography with the second exposure value to acquire a second image not including the saturated pixel value. Preferably, the setter 104b sets a plurality of exposure values as an exposure parameter, and the system controller 107 captures a plurality of images with the plurality of exposure values.

Specifically, in this embodiment, the photography (continuous photographing) is performed $\Delta EV(=EVs-EVp+1)$ times while the exposure value as the exposure parameter increases from the exposure value EVp up to the maximum exposure value EVs. The continuous photographing that is performed while changing the exposure value as described above is called HDR bracket photographing. An image which is to be captured with the maximum exposure value EVs among the plurality of captured images is replaced with the image IMGp that is previously captured with the same exposure value, and accordingly a time required for capturing an image can be reduced.

While any of the shutter speed and the aperture value may be changed in this case, it is preferred that the HDR bracket photographing is performed while decreasing the opening (aperture) at short (i.e., high) shutter speed appropriately in order to minimize a variation of an object during the HDR bracket photographing. Alternatively, when the object does not move, the HDR bracket photographing is performed while fixing the size of the opening and appropriately changing the shutter speed, and thus a plurality of images without variation of a blur effect can be obtained.

In this embodiment, the HDR bracket photographing up to the maximum exposure value EVs may not be necessarily performed. In other words, the number of maximum photographing times can be set to an arbitrary value, for example eight. Accordingly, when an extremely bright object such as sun exists in an image, an enormous increase of the number of times of photography can be prevented. Alternatively, the continuous photographing may be performed while increasing the exposure value, for example every two steps. As a result, although the resolution of the gradation decreases, the number of times of the photography can be reduced. The continuous photographing may be performed while changing the exposure value within a range from EVp−ΔEV to EVp+ΔEV. As a result, luminance information can be obtained within a balanced range with respect to a targeted object. As described above, the image processor 104 generates a plurality of intermediate images IMGm by using the digital signal which is output from the image sensor 102 and is obtained by performing the A/D conversion by the A/D converter 103.

Subsequently, at step S105, the image processor 104 synthesizes (combines) the plurality of intermediate images IMGm to generate the HDR image (synthetic image or composite image). A method of generating the HDR image based on the plurality of images with different exposure values is commonly known, and any methods may be used. As an example, when ΔEV=3 is satisfied, the HDR image is generated as follows.

Figure 6:
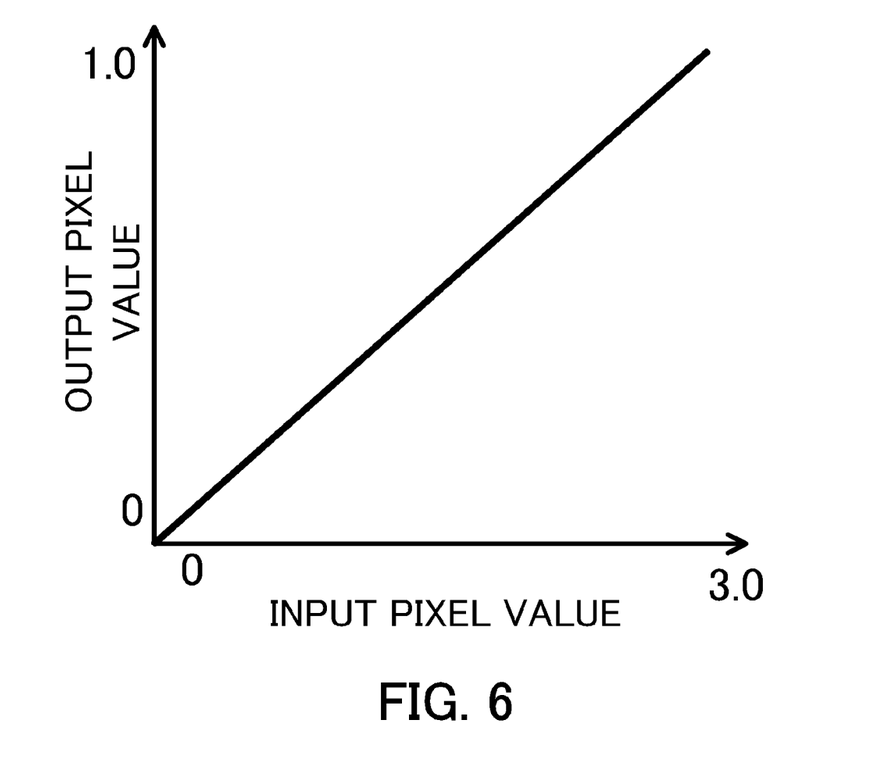
FIG. 6 is a conversion property diagram of a gradation compression in Embodiment 1.

Images with a minimum exposure value, an intermediate exposure value, and a maximum exposure value are referred to as IMG1, IMG2, and IMG3, respectively. First, with respect to a pixel included in a luminance-saturated region detected in the image IMG2, a pixel with the same index in the image IMG1 is accumulated to generate an intermediate synthetic image IMG12. Subsequently, with respect to a pixel included in a luminance-saturated region detected in the image IMG3, a pixel with the same index in the intermediate synthetic image IMG12 is accumulated to generate an intermediate synthetic image IMG123. The intermediate synthetic image IMG123 has the number of gradations up to three times as many as that of each of the images IMG1, IMG2, and IMG3. Accordingly, the gradation is compressed (i.e., the number of gradations is decreased) to one-third by using a known technology called tone mapping. For example, in the simplest manner, a conversion property as illustrated in FIG. 6 is used. FIG. 6 is a conversion property diagram for a gradation compression. In FIG. 6, a horizontal axis and a vertical axis indicate a pixel value (input pixel value) of an input image (intermediate synthetic image IMG123) and a pixel value (output pixel value) of an output image, respectively. The gradation is compressed based on this conversion property, and accordingly the HDR image where the luminance range is widened can be generated while it has the same gradation as that of each of the images IMG1, IMG2, and IMG3.

Subsequently, at step S106, the system controller 107 stores the HDR image generated by the image processor 104 in the image storage medium 109. The system controller 107 may display the HDR image on the image display unit 105. The system controller 107 may store the images IMG1, IMG2, and IMG3 in the image storage medium 109.

According to the image pickup apparatus of this embodiment, an appropriate maximum exposure value that is required for HDR bracket photographing can be obtained by estimating a luminance value (maximum luminance value) in a luminance-saturated region (saturated pixel region) based on a single image. Consequently, it is possible to prepare the HDR bracket photographing simply and quickly.

Embodiment 2

Next, Embodiment 2 of the present invention will be described. The embodiment describes an image pickup apparatus which estimates a maximum luminance value based on a single image and sets an exposure value based on the estimated maximum luminance value to perform HDR photographing. The image pickup apparatus of Embodiment 1 generates the HDR image by using the plurality of captured images while changing the exposure value, and on the other hand, the image pickup apparatus of this embodiment generates the HDR image by using an image sensor which can change an exposure for each pixel. A basic configuration of the image pickup apparatus in this embodiment is the same as that of the image pickup apparatus 10 in Embodiment 1 described referring to FIG. 4, and accordingly descriptions thereof are omitted.

Figure 7:
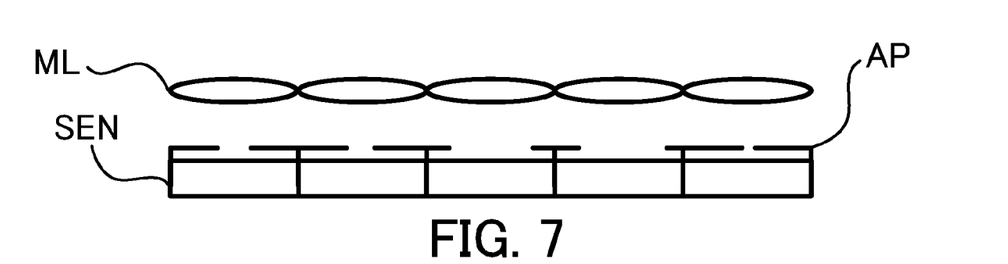
FIG. 7 is a schematic diagram of an image sensor in Embodiment 2.

First, referring to FIG. 7, an image sensor 102 of this embodiment will be described. FIG. 7 is a schematic diagram of the image sensor 102, and it illustrates a cross section of the image sensor 102 when viewed in a direction orthogonal to an optical axis. The image sensor 102 includes a variable aperture AP (aperture stop) on a photoelectric conversion element SEN and a microlens array ML. Furthermore, the image sensor 102 includes a color filter and a low-pass filter (not illustrated). Each variable aperture AP corresponds to each pixel of the photoelectric conversion element SEN, and each variable aperture AP varies a size of its opening area for each pixel independently according to an instruction of the system controller 107. The variable aperture AP has for example a circle whose size is variable, and a shutter that opens and closes only in a direction and other configurations can be adopted as long as an amount of light incident on the photoelectric conversion element SEN is adjustable.

In this embodiment, as the image sensor 102, instead of using the image sensor with the variable aperture AP, an image sensor which can change an exposure time for each pixel may be used. In other words, the image sensor which can read out accumulated charges for each pixel at an arbitrary timing can be used. Alternatively, an image sensor which can set a gain variable for each pixel to an output signal as described above, or an image sensor which includes a liquid crystal device or the like where a transmittance is controllable independently for each pixel may be used. The image pickup apparatus of this embodiment can adjust an exposure value for each pixel independently of an exposure value adjusted by the image pickup optical system 100 according to any mechanism described above. Hereinafter, this exposure value is called a pixel exposure value.

Figure 8:
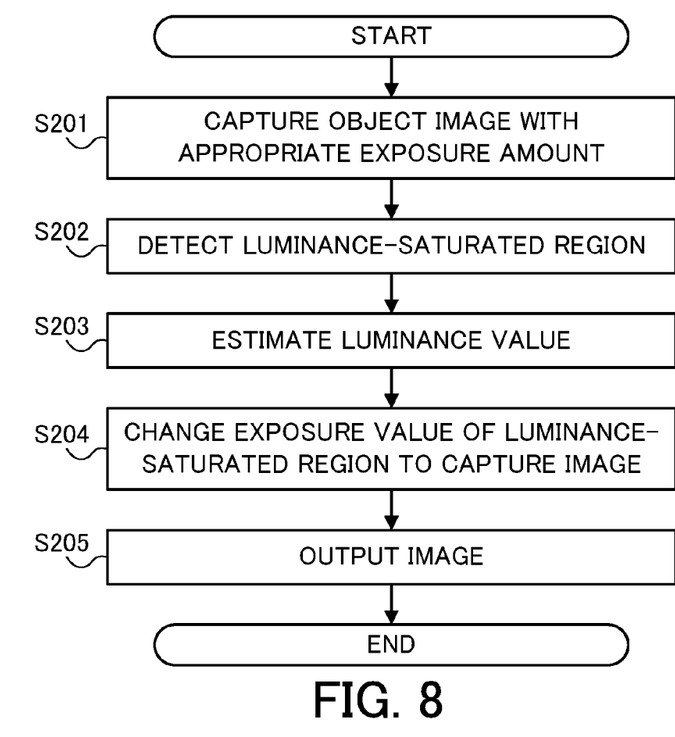
FIG. 8 is a flowchart of an image processing method in Embodiment 2.

Next, referring to FIG. 8, an image processing method (image processing program) in this embodiment will be described. Each step of FIG. 8 is performed mainly by the image processor 104 (the estimator 104a and the setter 104b) based on an instruction of the system controller 107.

First, at step S201, the system controller 107 controls the image pickup system including the image pickup optical system 100 and the image sensor 102 to perform photographing of an object. For example, a commonly known evaluation photometry is performed by using a photometry device (not illustrated) and a value appropriate for an entire angle of view is used as an exposure value EVp during photography. The pixel exposure value is fixed to a reference exposure value localEV0 on an entire surface of the image sensor 102. The reference exposure value localEV0 is for example an exposure value in a state where all the variable apertures AP are open with a maximum size. The image processor 104 generates an image IMGp (preparation image) by using a digital signal that is output from the image sensor 102 and is obtained by the A/D conversion of the A/D converter 103.

Subsequently, at step S202, similarly to step S102 in Embodiment 1, the image processor 104 detects the luminance-saturated region REGs (saturated pixel region). If the luminance-saturated region REGs is not detected, subsequent steps S203 and S204 are skipped and the image IMGp can be dealt with as an output image.

Subsequently, at step S203, the image processor 104 (estimator 104a) performs luminance value estimation processing on the luminance-saturated region REGs of the image IMGp. Specifically, the image processor 104 reconstructs a pixel value distribution of the luminance-saturated region REGs by the luminance value estimation method described above, and it acquires a maximum pixel value Ilocalmax for each luminance-saturated region. Then, the image processor 104 calculates an exposure value localEVs appropriate for each luminance-saturated region as represented by expression (6) below by using the maximum pixel value Ilocalmax.

$$localEVs = localEV_0 + \log_2 ceil(I_{local\ max}/I_s) \qquad (6)$$

In expression (6), symbol ceil denotes a function of rounding up digits after the decimal point.

Subsequently, at step S204, with respect to the luminance-saturated region REGs, the system controller 107 adjusts the variable aperture AP for each pixel to be set to the pixel exposure value localEVs appropriate for each luminance-saturated region to perform the photography. In this case, the exposure value is set to EVp. As described above, the setter 104b sets, as an exposure parameter, an exposure value for each pixel (pixel region) of the image sensor 102. Then, the system controller 107 captures a single image with the exposure value for each pixel region. The image processor 104 generates the HDR image by using the digital signal that is output from the image sensor 102 and obtained by the A/D conversion of the A/D converter 103.

Subsequently, at step S205, the system controller 107 stores the HDR image generated by the image processor 104 in the image storage medium 109. The system controller 107 may display the HDR image on the image display unit 105.

According to the image pickup apparatus of this embodiment, an appropriate maximum exposure value that is required for HDR bracket photographing can be obtained by estimating a maximum luminance in a luminance-saturated region based on a single image. Consequently, it is possible to prepare the HDR photographing simply and quickly.

Embodiment 3

Next, Embodiment 3 of the present invention will be described. In this embodiment, an image pickup apparatus which performs an estimation of a luminance value based on a single image captured without performing photometry and a HDR bracket photographing repeatedly will be described. A basic configuration of the image pickup apparatus in this embodiment is the same as that of the image pickup apparatus 10 in Embodiment 1 described referring to FIG. 4, and accordingly descriptions thereof are omitted.

Figure 9A:
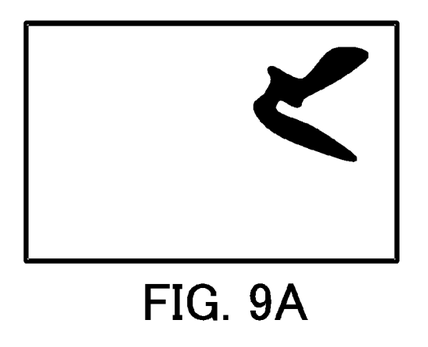
FIGS. 9A and 9B are examples of images each including a luminance-saturated region in Embodiment 3.
Figure 9B:
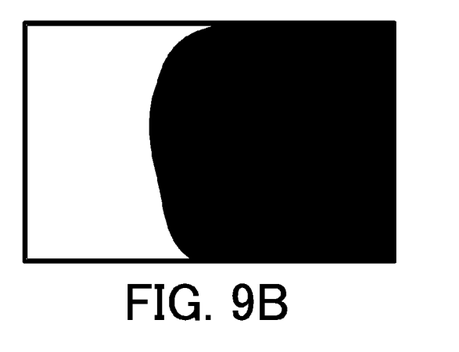

FIGS. 9A and 9B are examples of images each including a luminance-saturated region. In FIGS. 9A and 9B, the luminance-saturated region is indicated as a black area. With respect to the method of estimating the luminance saturation described above, when a shape of the luminance-saturated region is irregular as the image illustrated in FIG. 9A or the luminance-saturated region is extremely large as the image illustrated in FIG. 9B, an estimation accuracy may be decreased. In this embodiment, the HDR image which reduces the luminance saturation with high accuracy can be generated by repeating the estimation of the luminance saturation and the HDR bracket photographing even in such a case.

Figure 10:
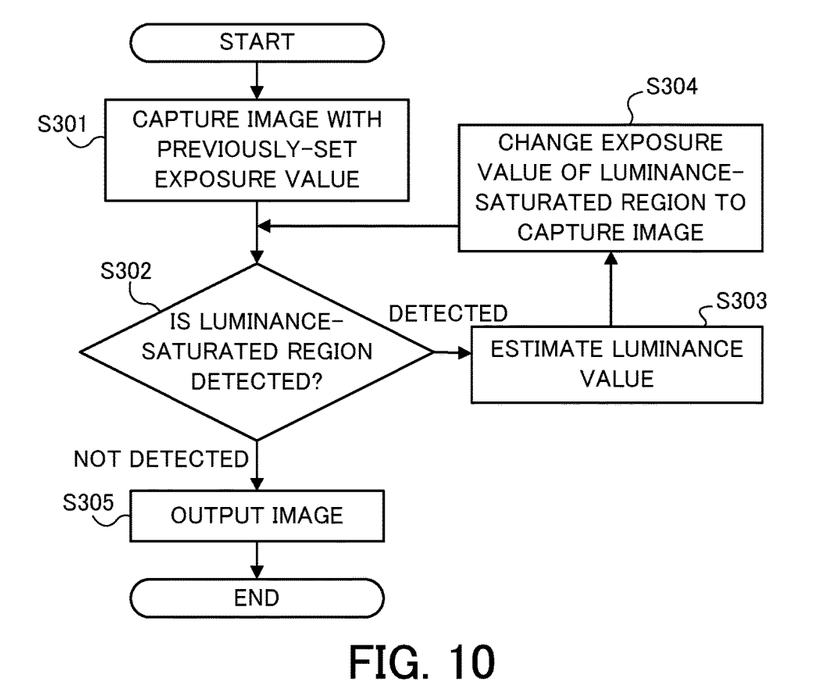
FIG. 10 is a flowchart of an image processing method in Embodiment 3.

Next, referring to FIG. 10, an image processing method (image processing program) in this embodiment will be described. Each step of FIG. 10 is mainly performed by the image processor 104 (the estimator 104a and the setter 104b) based on an instruction of the system controller 107.

First, at step S301, the system controller 107 controls an image pickup system including the image pickup optical system 100 and the image sensor 102 to perform photographing of an object. As an exposure value EVp during photography, an arbitrary value such as a previously-set reference value and a value set by a user is used. The image processor 104 generates an image IMGp (preparation image) by using a digital signal output from the image sensor 102 and obtained by the A/D conversion of the A/D converter 103.

Subsequently, at step S302, the image processor 104 reads out a saturated pixel value Is from the memory 108. Then, the image processor 104 detects a plurality of pixels with pixel values each indicating the saturated pixel value Is as a luminance-saturated region REGs (saturated pixel region) in the image IMGp or a single image with a maximum exposure value among a plurality of intermediate images IMGm described below. When the luminance-saturated region REGs (i.e., pixel with the saturated pixel value Is) is not detected, the flow proceeds to step S305. On the other hand, when the luminance-saturated region REGs (i.e., pixel with the saturated pixel value Is) is detected, the flow proceeds to step S303. Even when any pixel with the saturated pixel value Is is detected at step S302, the flow may proceed to step S305 if the number of the pixels are not greater than the previously-set number or the arbitrary number set by the user.

Steps S303, S304, and S305 are the same as steps S103, S104, and S105, respectively, described in Embodiment 1 referring to FIG. 5. In this embodiment, the estimator 104a estimates a second luminance value based on a second single image obtained by photography based on an exposure parameter. The setter 104b sets a second exposure parameter based on the second luminance value. Then, the system controller 107 performs second photographing based on the second exposure parameter.

According to the image pickup apparatus of this embodiment, the estimation of the luminance value and the HDR bracket photographing are repeated, and as a result it is possible to prepare the HDR photographing simply and quickly without photometry.

Other Embodiments

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

As described above, according to the image pickup apparatus of each embodiment, an exposure value appropriate for HDR photographing can be obtained from a single image by estimating a luminance value which is outside a luminance range, and as a result it is possible to perform HDR bracket photographing simply and quickly. Consequently, according to each embodiment, the image pickup apparatus, the image processing apparatus, the image processing method, the non-transitory computer-readable storage medium which improve quality of a captured image easily and quickly can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-251192, filed on Dec. 24, 2015, which is hereby incorporated by reference herein in its entirety.

What is claimed is:

1. An image pickup apparatus comprising:
an image sensor configured to photoelectrically convert an optical image formed via an image pickup optical system to output image data;
a detector configured to detect a saturated pixel of the image sensor based on a single image corresponding to the image data;
an estimator configured to estimate a luminance value, which is outside a luminance range of the image sensor, of a pixel that was detected to be the saturated pixel of the image sensor based on the single image corresponding to the image data;
a setter configured to set an exposure parameter based on the estimated luminance value; and
a controller configured to perform photography based on the set exposure parameter.

2. The image pickup apparatus according to claim 1, wherein the saturated pixel is a pixel where an accumulable maximum charge amount is accumulated of a plurality of pixels of the image sensor.

3. The image pickup apparatus according to claim 2, wherein the single image is an image including a saturated pixel value corresponding to the maximum charge amount.

4. The image pickup apparatus according to claim 1, wherein the estimator is configured to estimate the luminance value of the saturated pixel based on a difference of pixel values of a plurality of pixels at a boundary of a saturated pixel region including the saturated pixel.

5. The image pickup apparatus according to claim 4, wherein the estimator is configured to estimate a pixel value distribution f relating to the luminance value of the saturated pixel to satisfy expressions below:

$$\nabla^2(\nabla \log f) = 0$$

$$\nabla^2 \log(f) = \nabla \cdot (\nabla \log(f))$$

where an initial value is a pixel value of a pixel at the boundary of the saturated pixel region.

6. The image pickup apparatus according to claim 1, wherein the setter is configured to set the exposure parameter based on a first exposure value and a second exposure value.

7. The image pickup apparatus according to claim 6, wherein the controller is configured to:
perform the photography with the first exposure value to acquire a first image including a saturated pixel value, and
perform the photography with the second exposure value to acquire a second image not including the saturated pixel value.

8. The image pickup apparatus according to claim 1, wherein:
the setter is configured to set a plurality of exposure values as the exposure parameter, and
the controller is configured to capture a plurality of images with the plurality of exposure values.

9. The image pickup apparatus according to claim 1, wherein:
the setter is configured to set an exposure value for each pixel region of the image sensor, and
the controller is configured to capture a single image with the exposure value for each pixel region.

10. The image pickup apparatus according to claim 1, wherein:
the estimator is configured to estimate a second luminance value based on a second single image obtained by the photography based on the set exposure parameter,
the setter is configured to set a second exposure parameter based on the estimated second luminance value, and
the controller is configured to perform second photography based on the set second exposure parameter.

11. An image processing apparatus comprising:
a detector configured to detect a saturated pixel of an image sensor based on a single image corresponding to image data output from the image sensor;
an estimator configured to estimate a luminance value, which is outside a luminance range of the image sensor, of a pixel that was detected to be the saturated pixel of the image sensor based on the single image;
a setter configured to set an exposure parameter based on the estimated luminance value; and
a synthesizer configured to combine a plurality of images obtained from the image sensor to output a composite image of the plurality of images, the plurality of images obtained from the image sensor including at least one image obtained using the set exposure parameter.

12. An image processing method comprising the steps of:
detecting a saturated pixel of an image sensor based on a single image corresponding to image data output from the image sensor;
estimating a luminance value, which is outside a luminance range of the image sensor, of a pixel that was detected to be the saturated pixel of the image sensor based on the single image;
setting an exposure parameter based on the estimated luminance value; and
combining a plurality of images obtained from the image sensor to output a composite image of the plurality of images, the plurality of images obtained from the image sensor including at least one image obtained using the set exposure parameter.

13. A non-transitory computer-readable storage medium storing an image processing program which causes a computer to execute a process comprising the steps of:
- detecting a saturated pixel of an image sensor based on a single image corresponding to image data output from the image sensor;
- estimating a luminance value, which is outside a luminance range of the image sensor, of a pixel that was detected to be the saturated pixel of the image sensor based on the single image;
- setting an exposure parameter based on the estimated luminance value; and
- combining a plurality of images obtained from the image sensor to output a composite image of the plurality of images, the plurality of images obtained from the image sensor including at least one image obtained using the set exposure parameter.

* * * * *